(12) United States Patent
Xu et al.

(10) Patent No.: US 12,425,616 B2
(45) Date of Patent: Sep. 23, 2025

(54) SCALED INTRA REFERENCE PICTURE

(71) Applicant: Tencent America LLC, Palo Alto, CA (US)

(72) Inventors: Xiaozhong Xu, State College, PA (US); Xin Zhao, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 57 days.

(21) Appl. No.: 18/376,333

(22) Filed: Oct. 3, 2023

(65) Prior Publication Data

US 2024/0163463 A1    May 16, 2024

Related U.S. Application Data

(60) Provisional application No. 63/425,557, filed on Nov. 15, 2022.

(51) Int. Cl.
*H04N 19/33* (2014.01)
*H04N 19/105* (2014.01)
*H04N 19/119* (2014.01)
*H04N 19/132* (2014.01)
(Continued)

(52) U.S. Cl.
CPC ........... *H04N 19/33* (2014.11); *H04N 19/105* (2014.11); *H04N 19/119* (2014.11); *H04N 19/132* (2014.11); *H04N 19/176* (2014.11); *H04N 19/46* (2014.11)

(58) Field of Classification Search
CPC .... H04N 19/105; H04N 19/11; H04N 19/119; H04N 19/132; H04N 19/176; H04N 19/33; H04N 19/46; H04N 19/59; H04N 19/593; H04N 19/70
See application file for complete search history.

(56) References Cited

U.S. PATENT DOCUMENTS

| | | | | |
|---|---|---|---|---|
| 2004/0213345 A1* | 10/2004 | Holcomb | ............. | H04N 19/527 |
| | | | | 375/240.03 |
| 2007/0147494 A1* | 6/2007 | Shimauchi | ............. | H04N 19/29 |
| | | | | 375/240.1 |
| 2013/0301736 A1* | 11/2013 | Sugio | ................... | H04N 19/147 |
| | | | | 375/240.16 |

(Continued)

FOREIGN PATENT DOCUMENTS

EP    4236324 A2 *   8/2023   ........... H04N 19/105

OTHER PUBLICATIONS

C. Muhammed, et al., Algorithm description of Enhanced Compression Model 7 (ECM 7), Joint Video Experts Team (JVET) of ITU-T SG 16 WP 3 and ISO/IEC JTC 1/SC 29, 28th Meeting, Mainz, DE, Oct. 20-28, 2022, JVET-AB2025, pp. 1-62.

*Primary Examiner* — Md N Haque
(74) *Attorney, Agent, or Firm* — ArentFox Schiff LLP

(57) ABSTRACT

Aspects of the disclosure include methods and apparatuses for video coding. The apparatuses include processing circuitry that receives a bitstream including a first sub-bitstream that corresponds to a scaled version of a current picture and a second sub-bitstream that corresponds to a current picture in a full scale. The processing circuitry reconstructs the scaled version of the current picture from the first sub-bitstream and reconstructs a second block in the current picture in the full scale based on (i) partitioning information of one or more first blocks in the scaled version of the current picture or (ii) intra prediction information of the one or more first blocks.

18 Claims, 11 Drawing Sheets

(51) Int. Cl.
*H04N 19/176* (2014.01)
*H04N 19/46* (2014.01)

(56) References Cited

U.S. PATENT DOCUMENTS

2014/0253681 A1* 9/2014 Zhang ................... H04N 19/513
 348/43
2020/0314417 A1* 10/2020 Abe ..................... H04N 19/176

* cited by examiner

SCALED INTRA REFERENCE PICTURE

INCORPORATION BY REFERENCE

The present application claims the benefit of priority to U.S. Provisional Application No. 63/425,557, "Scaled Intra Reference Picture" filed on Nov. 15, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress image based on temporal redundancy. For example, the inter prediction can predict samples in a current picture from previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry. The processing circuitry receives a bitstream including a first sub-bitstream that corresponds to a scaled version of a current picture having a first spatial resolution and a second sub-bitstream that corresponds to a current picture in a full scale having a second spatial resolution that is higher than the first spatial resolution. The processing circuitry reconstructs the scaled version of the current picture from the first sub-bitstream and reconstructs the second block in the current picture in the full scale based on (i) partitioning information of one or more first blocks in the scaled version of the current picture or (ii) intra prediction information of the one or more first blocks in the scaled version.

In an example, a first region in the scaled version of the current picture is collocated with the second block in the current picture in the full scale, and the first region overlaps with the one or more first blocks in the scaled version of the current picture.

In an example, a first sample in the second block can be predicted based on a reconstructed sample in the first region in the scaled version of the current picture. The first sample in the second block is collocated with the reconstructed sample in the first region. A second sample in the second block can be predicted by interpolation based on at least the predicted first sample in the second block and a top-left reconstructed sample in the second block. A predictor of the second block includes (i) the predicted first sample in the second block, (ii) the top-left reconstructed sample in the second block, and (iii) the predicted second sample in the second block. The second block is reconstructed from the predictor of the second block.

In an example, samples in the second block are predicted using intra prediction. (i) The predicted samples in the second block and (ii) corresponding up-sampled reconstructed samples in the first region in the scaled version of the current picture can be blended using a weighted average. Weights of the blended samples in the second block depend on positions of the blended samples in the second block.

In an example, the reconstructed samples in the first region of the scaled version of the current picture are up-sampled. The up-sampled samples in the first region of the scaled version are filtered. The second block can be reconstructed with the filtered up-sampled samples in the first region as a predictor for the second block.

In an example, residues for samples in the second block can be predicted based on residues of the reconstructed samples in the first region. Whether the samples in the second block have non-zero residues can be predicted based on a distribution of non-zero residues in the first region. In an example, a distribution of non-zero residues in the second block is arithmetic decoded, and a distribution of non-zero residues in the first region is used as a context for the arithmetic decoding.

In an embodiment, the partitioning information of the one or more first blocks indicates whether each of the one or more first blocks is split into smaller blocks. The second block can be reconstructed based on the partitioning information of the one or more first blocks by determining whether to partition the second block in the current picture in the full scale based on the partitioning information of the one or more first blocks. The processing circuitry reconstructs the second block based on a determination of whether to partition the second block.

In an example, the second sub-bitstream includes a flag for the second block. In response to the determination of partitioning the second block, the flag indicates whether a split is applied to a block partitioned from the second block. In response to the determination of not partitioning the second block, the flag indicates whether a split is applied to the second block.

In an example, the partitioning information includes a flag for each of the one or more first blocks indicating whether the respective first block is split into smaller blocks. Partitioning information of the second block can be entropy decoded, and the flag for each of the one or more first blocks can be used as a context for the entropy decoding.

In an example, the intra prediction information includes intra prediction mode (IPM) information of the one or more first blocks. A most probable mode (MPM) list for the second block can be constructed based on the IPM information of the one or more first blocks. The second block can be reconstructed based on the MPM list.

In an example, the intra prediction information includes reference line index information of the one or more first blocks. A reference line index for the second block can be determined based on the reference line index information of the one or more first blocks and the second block can be reconstructed based on the reference line index for the second block.

In an example, the second sub-bitstream indicates that an intra skip mode is used for the second block. The intra prediction information indicates a prediction mode of one of the one or more first blocks. The prediction mode of the one of the one or more first blocks can be used for the second block and the second block can be reconstructed based on the prediction mode.

Aspects of the disclosure also provide a non-transitory computer-readable medium storing instructions which when executed by a computer cause the computer to perform the method for video encoding/decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
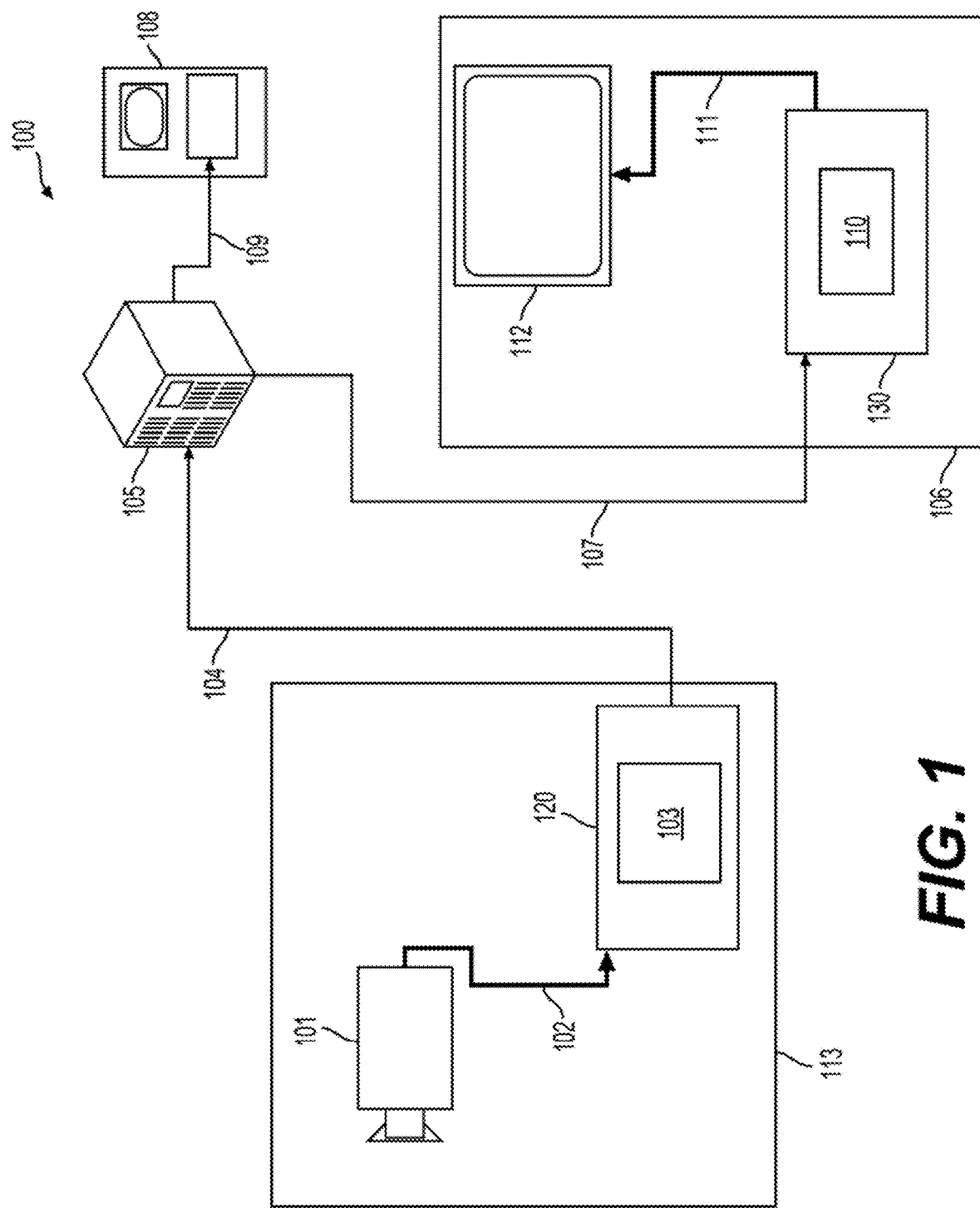
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
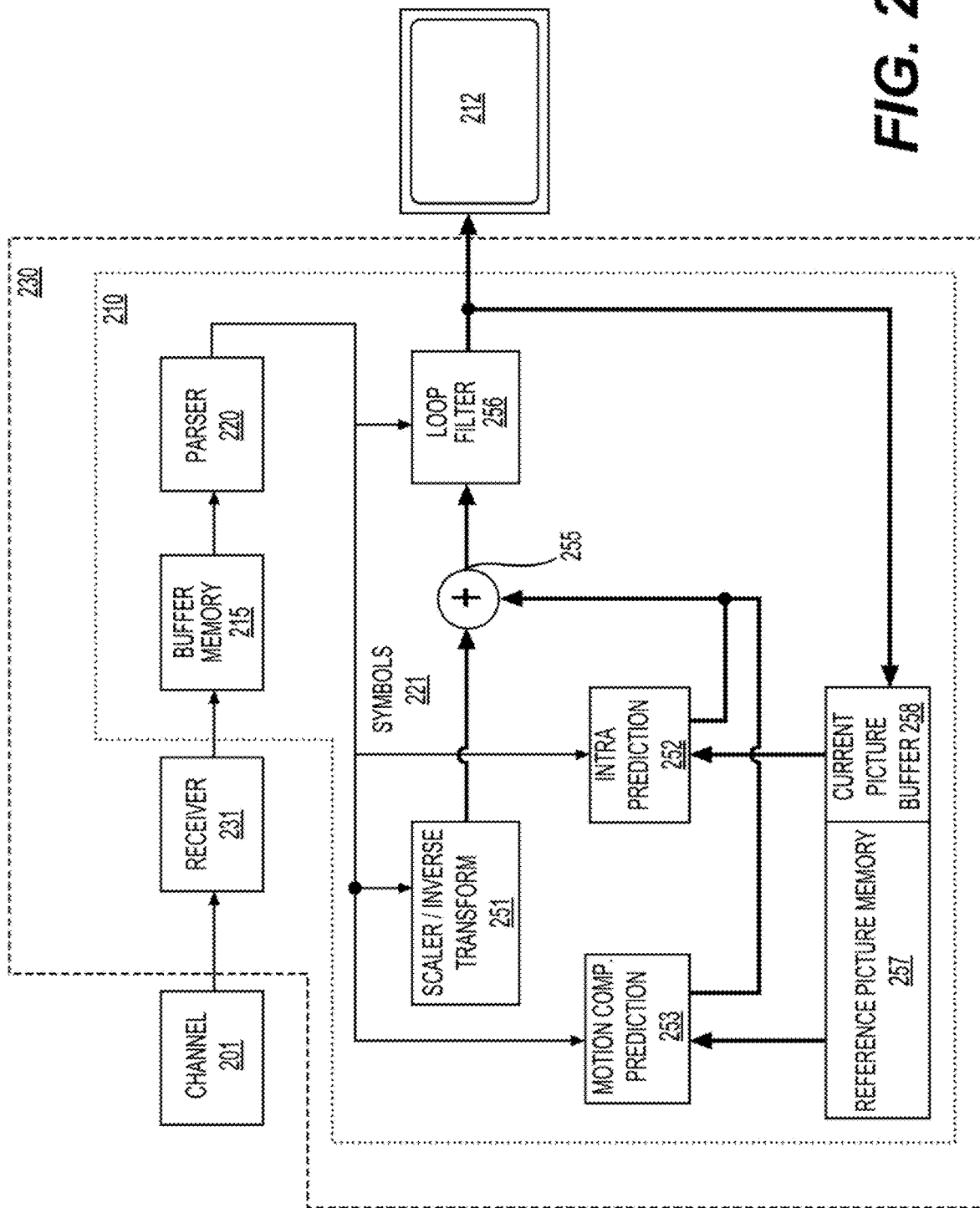
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
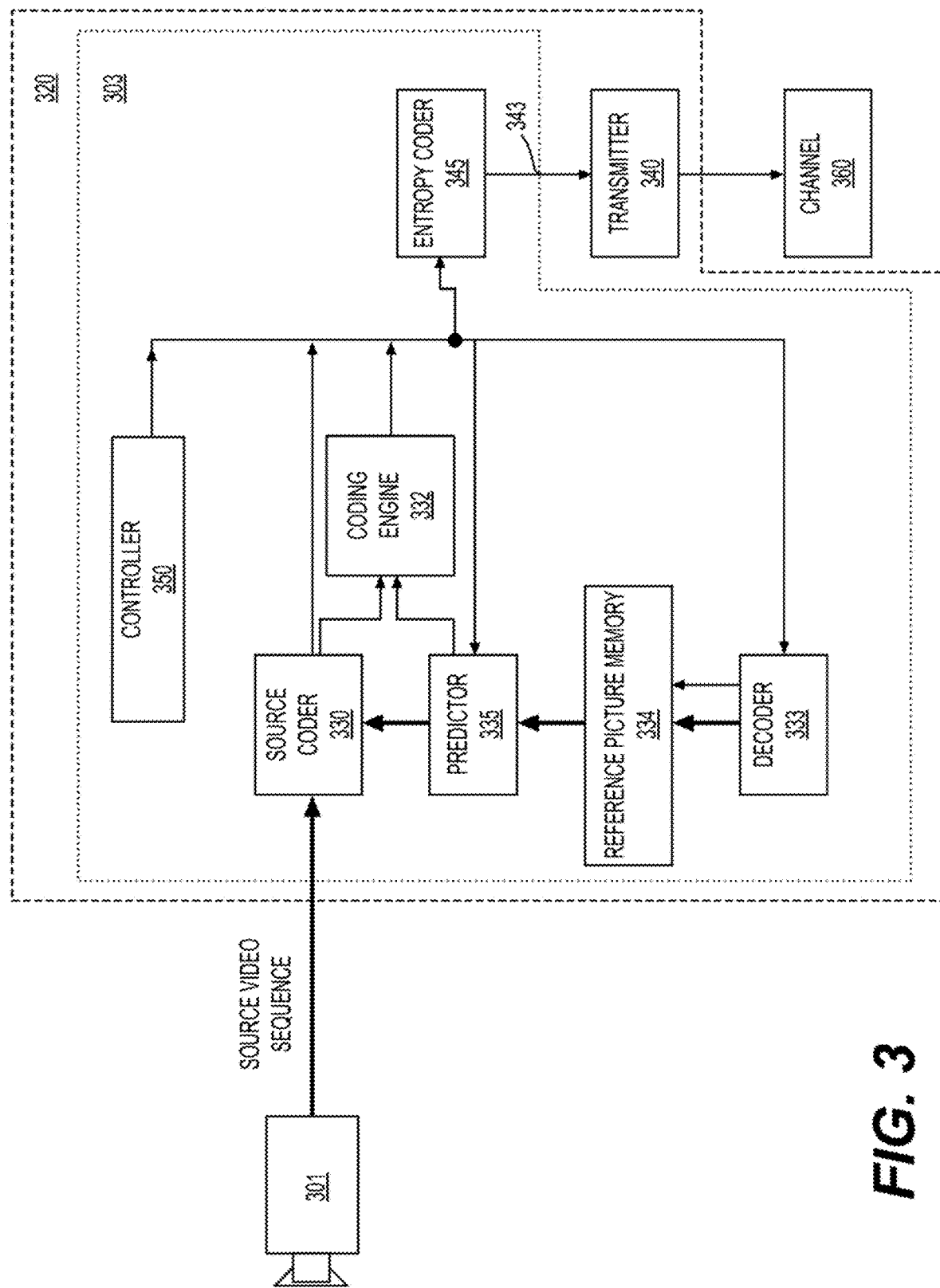
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and a reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Inter predictions and related methods are described in detail below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from collocated CU(s), history-based MVP(s) (HMVP(s)) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Figure 4:
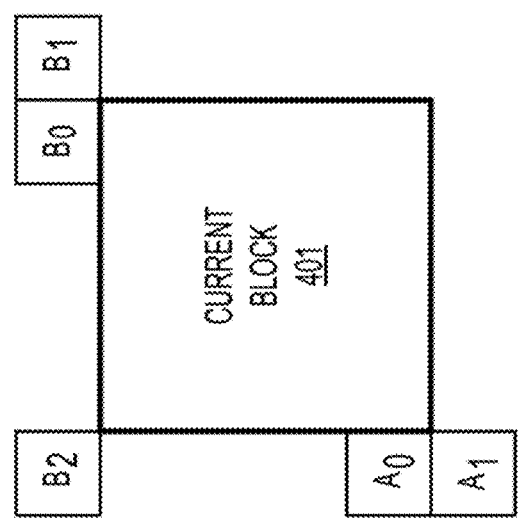
FIG. 4 shows positions of spatial merge candidates according to an embodiment of the disclosure.

Some examples of a generation process of each category of merge candidates are provided below. In an embodiment, spatial candidate(s) are derived as follows. The derivation of spatial merge candidates in VVC can be identical to that in HEVC. In an example, a maximum of four merge candidates are selected among candidates located in positions depicted in FIG. 4. FIG. 4 shows positions of spatial merge candidates according to an embodiment of the disclosure. Referring to FIG. 4, an order of derivation is B1, A1, B0, A0, and B2. The position B2 is considered only when any CU of positions A0, B0, B1, and A1 is not available (e.g., because the CU belongs to another slice or another tile) or is intra coded. After a candidate at the position A1 is added, the addition of the remaining candidates is subject to a redundancy check which ensures that candidates with same motion information are excluded from the candidate list so that coding efficiency is improved.

Figure 5:
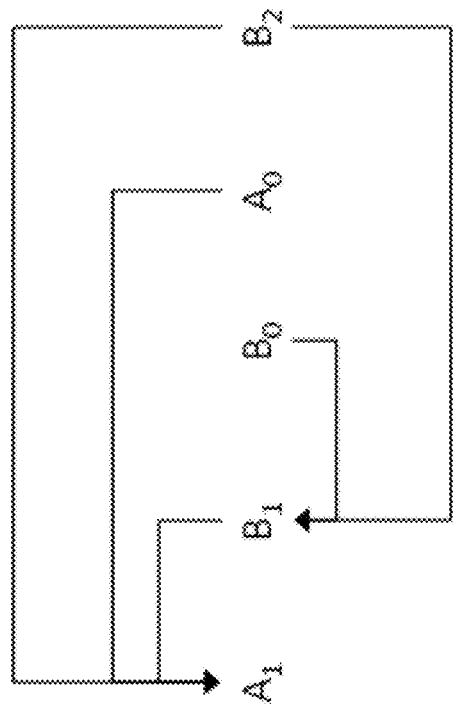
FIG. 5 shows candidate pairs that are considered for a redundancy check of spatial merge candidates according to an embodiment of the disclosure.

To reduce computational complexity, not all possible candidate pairs are considered in the mentioned redundancy check. Instead, only pairs linked with an arrow in FIG. 5 are considered and a candidate is only added to the candidate list if the corresponding candidate used for the redundancy check does not have the same motion information. FIG. 5 shows candidate pairs that are considered for a redundancy check of spatial merge candidates according to an embodiment of the disclosure. Referring to FIG. 5, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

Figure 6:
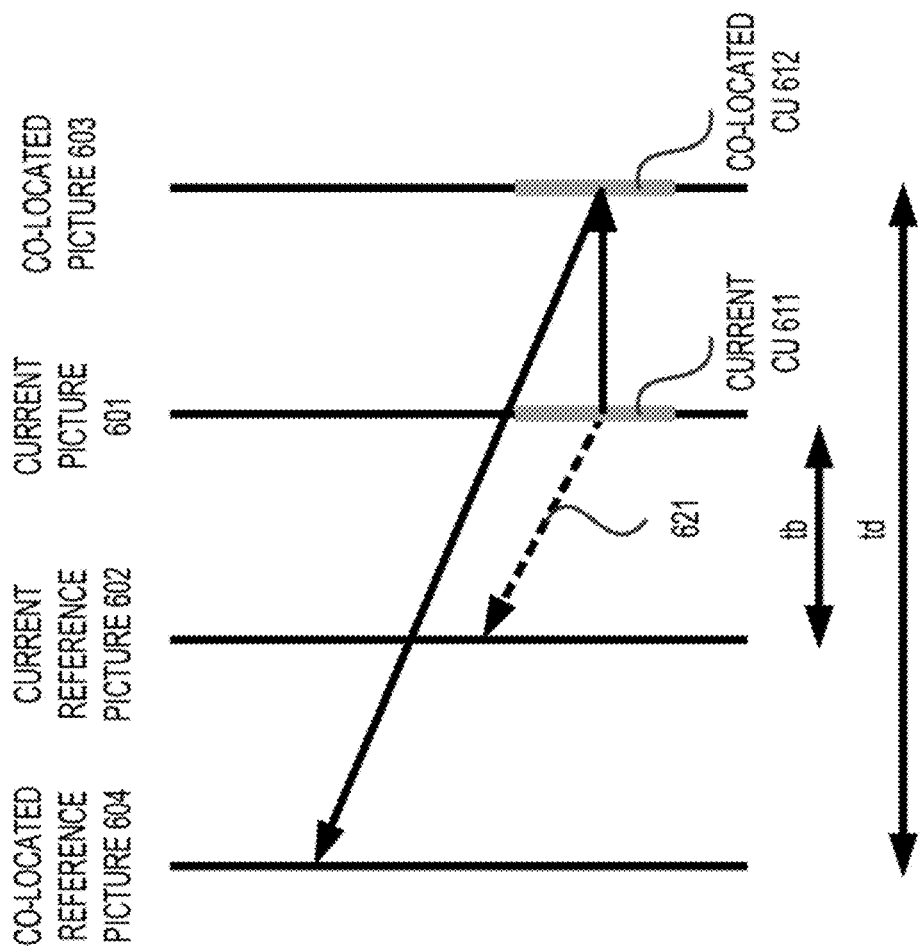
FIG. 6 shows exemplary motion vector scaling for a temporal merge candidate.

In an embodiment, temporal candidate(s) are derived as follows. In an example, only one temporal merge candidate is added to the candidate list. FIG. 6 shows exemplary motion vector scaling for a temporal merge candidate. To derive the temporal merge candidate of a current CU (611) in a current picture (601), a scaled MV (621) (e.g., shown by a dotted line in FIG. 6) can be derived based on a collocated CU (612) belonging to a collocated reference picture (604). In an example, the collocated reference picture (also referred to as the collocated picture) is a particular reference picture, for example, used for temporal motion vector prediction. The collocated reference picture used for the temporal motion vector prediction can be indicated by a reference index in a syntax, such as a high-level syntax (e.g., a picture header, a slice header).

A reference picture list used to derive the collocated CU (612) can be explicitly signaled in a slice header. The scaled MV (621) for the temporal merge candidate can be obtained as shown by the dotted line in FIG. 6. The scaled MV (621) can be scaled from the MV of the collocated CU (612) using picture order count (POC) distances tb and td. The POC distance tb can be defined to be the POC difference between a current reference picture (602) of the current picture (601) and the current picture (601). The POC distance td can be defined to be the POC difference between the collocated reference picture (604) of the collocated reference picture (603) and the collocated reference picture (603). A reference picture index of the temporal merge candidate can be set to zero.

Figure 7:
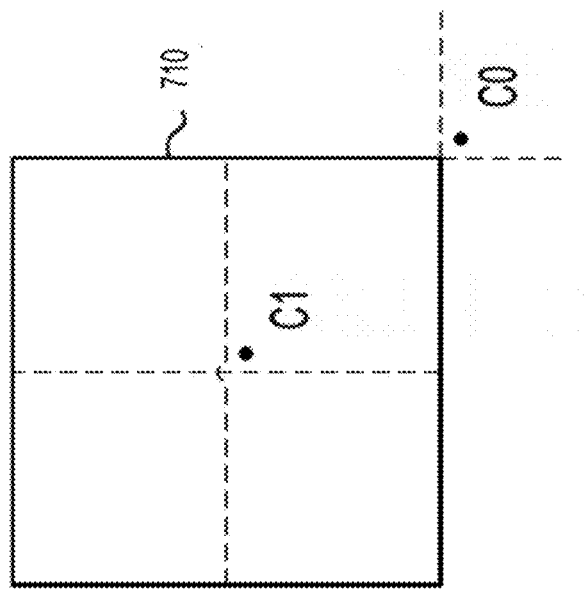
FIG. 7 shows exemplary candidate positions for a temporal merge candidate of a current CU.

FIG. 7 shows exemplary candidate positions (e.g., C0 and C1) for a temporal merge candidate of a current CU. A position for the temporal merge candidate can be selected from the candidate positions C0 and C1. The candidate position C0 is located at a bottom-right corner of a co-located CU (710) of the current CU. The candidate position C1 is located at a center of the co-located CU (710) of the current CU. If a CU at the candidate position C0 is not available, is intra coded, or is outside of a current row of CTUs, the candidate position C1 is used to derive the temporal merge candidate. Otherwise, for example, the CU at the candidate position C0 is available, intra coded, and in the current row of CTUs, the candidate position C0 is used to derive the temporal merge candidate.

An intra block copy (IBC) mode can be used in video coding, such as in HEVC, VVC, or the like. In an example, such as in HEVC, the IBC concept requires additional memory in DPB, for which hardware implementation employs external memory. The additional external memory access comes with an increased memory bandwidth. In an example, such as in VVC, the IBC mode uses a fixed memory that can realize the IBC by using on-chip memory to significantly decrease the memory bandwidth requirement and hardware complexity. The reference sample memory (RSM) can be used to hold samples of a single CTU. The special feature of the RSM is a continuous update mechanism replacing the reconstructed samples of the left neighboring CTU with the reconstructed samples of the current CTU. The block vector (BV) coding of IBC employs the concept of a merge list for inter prediction. The IBC list construction process considers two spatial neighbor's BVs and five history-based BVs (HBVP). In an example, only the first HBVP is compared with spatial candidates when added to the candidate list. While the regular inter prediction uses two different candidate lists, one for the merge mode and the other for the regular mode, the candidate list in IBC is for both cases. The merge mode may use up to six candidates of the list, where the regular mode uses only the first two candidates. The block vector difference (BVD) coding employs the motion vector difference (MVD) process, resulting in a final BV of any magnitude. The reconstructed BV may point to an area outside of the reference sample area, requiring a correction by removing the absolute offset for each direction using the modulo operation with the RSM's width and height.

Figure 8:
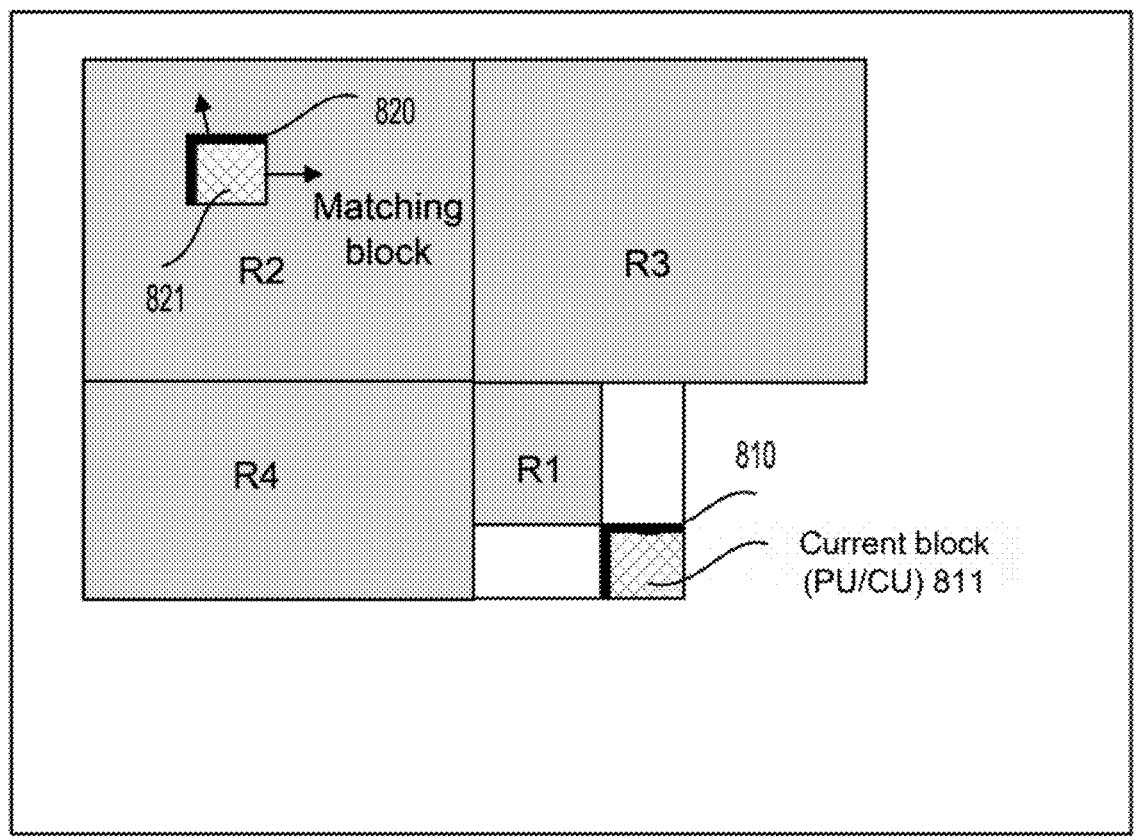
FIG. 8 shows an example of an intra template matching prediction (IntraTMP) mode according to an embodiment of the disclosure.

FIG. 8 shows an example of an intra template matching prediction (IntraTMP) mode according to an embodiment of the disclosure. In an embodiment, such as in ECM software, the IntraTMP is a special intra prediction mode that can copy the best prediction block (821) from a reconstructed part of a current frame (or a current picture), where a template (e.g., an L-shaped template) (820) of the best prediction block (821) can match a current template (810) of a current block (811). For a predefined search range, an encoder can search for the most similar template (820) to the current template (810) in the reconstructed part of the current frame and can use the corresponding block (821) as a prediction block. The encoder can signal the usage of the IntraTMP mode, and the same prediction operation can be performed at the decoder side.

The prediction signal can be generated by matching the current template (810), such as an L-shaped causal neighbor of the current block (811), with a template (e.g., (820)) of another block (e.g., (821)) in a predefined search area. An exemplary search area shown in FIG. 8 can include multiple CTUs (or SBs). Referring to FIG. 8, the search area can include a current CTU R1 (e.g., a portion of the current CTU R1), a top-left CTU R2, an above CTU R3, and a left CTU R4. The cost function can include any suitable cost function, such as a sum of absolute differences (SAD).

Within each region, the decoder can search for a template (e.g., (820)) that has the least cost (e.g., the least SAD) with respect to the current template (810) and can use a block (e.g., (821)) associated with the template having the least SAD as a prediction block.

Dimensions of regions indicated by (SearchRange_w, SearchRange_h) can be set to be proportional to a block dimension (BlkW, BlkH) to have a fixed number of SAD comparisons per pixel. For example, $$SearchRange\_w = a*BlkW \qquad \text{Eq. (1)}$$

$$SearchRange\_h = a*BlkH \qquad \text{Eq. (2)}$$

The parameter 'a' can be a constant that controls the trade-off between the gain and the complexity. In an example, 'a' is 5.

The Intra template matching tool can be enabled for CUs with certain sizes, such as sizes less than or equal to 64 in width and height. The maximum CU size for the IntraTMP mode can be configurable.

The IntraTMP mode can be signaled, for example, at a CU level through a dedicated flag when decoder-side intra mode derivation (DIMD) is not used for a current CU.

Figure 9:
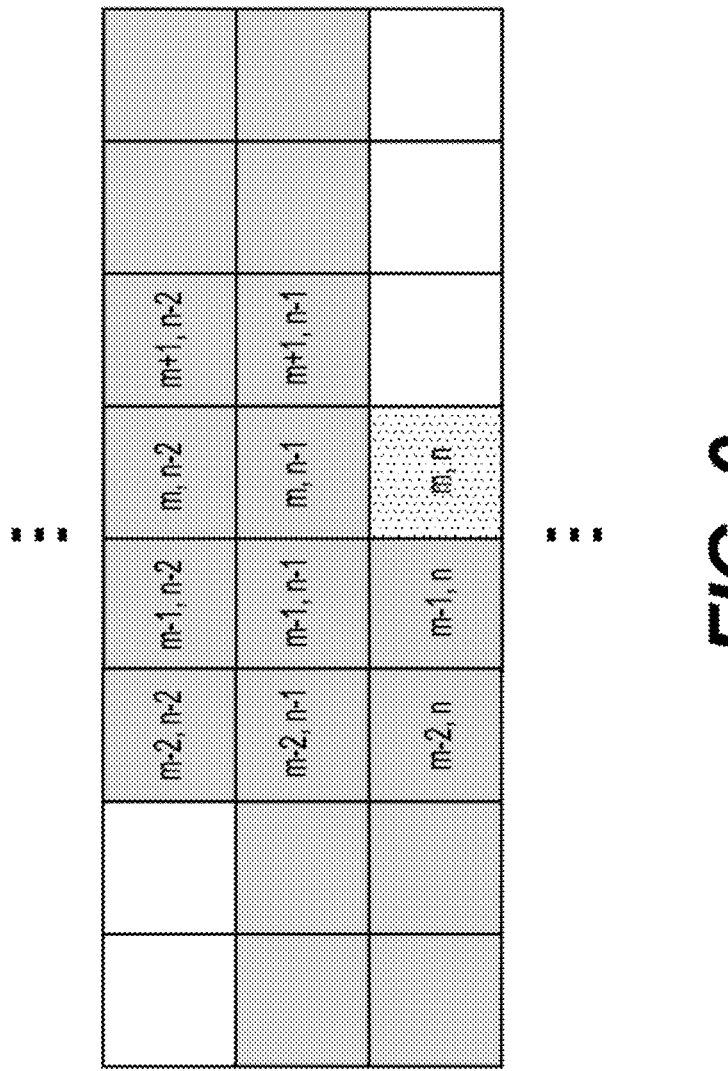
FIG. 9 shows an example of a reference area for coding a CTU (m, n).

In an example, such as in ECM5, the IntraTMP mode accesses 320 upper samples and 320 left samples to support a 64×64 block. The memory size, such as 320 upper samples and 320 left samples of a block, can improve the coding efficiency of the IBC mode. The reference area or the search range for the IBC mode can be extended. In an example, the reference area for the IBC mode is extended to two CTU rows above. FIG. 9 shows an example of the reference area for coding a CTU (m, n). Integers m and n are indices representing a position of a CTU. To code CTU (m, n), the reference area can include CTUs with indices (m−2, n−2), . . . , (W−1, n−2), (0, n−1) (W−1, n−1), (0, n), . . . , and (m, n), where W denotes a maximum horizontal index for a CTU within a current tile, a slice, a picture, or the like. The setting (e.g., accessing 320 upper samples and 320 left samples to predict a block) can ensure that for a CTU size of 128×128, the IBC mode does not require extra memory in the current test Model of Essential Video Coding (ETM) platform. The per-sample block vector search range (or referred to as a local search range) can be limited to [−(C<<1), C>>2] (or [−2C, ¼C]) horizontally and [−C, C>>2] (or [−C, ¼C]) vertically to adapt to the reference area extension. C denotes the CTU size, such as 128. For example, a BV of a block is limited to be with [−2C, ¼C] horizontally and [−C, ¼C] vertically.

Scalable video coding can be applied to an intra picture. In various examples, such as in AVC and HEVC Scalable coding standards, scalable video coding can include one or more of temporal scalability, spatial scalability, and SNR scalability. For scalable video coding technologies, in some examples, both a base layer and an enhancement layer are needed for display purposes.

In intra prediction, in some examples, a limitation is that prediction samples generated from a top-left reconstruction area has less correlation with a bottom-right region of a current block. Methods described in the disclosure (e.g., embodiments described in FIGS. 10-12) can be used to generate more accurate prediction samples. Further, in some examples, blocks in a higher resolution picture (e.g., (1001)) can be generated based on blocks in a lower resolution picture (e.g., (1002)), and thus less bits are transmitted and coding efficiency can be increased.

Methods described in the disclosure can utilize a scaled intra coded picture of the same content as a reference for predicting a current picture. A scaled version of the current picture or a scaled picture can refer to a down-sampled version of the current picture. A current picture in full scale (also referred to as a current picture with the full scale) can refer to the current picture with its original resolution or the original resolution of the current picture.

A scaled version of the current picture can be compressed, as part of the intra coding framework. In the bitstream, the coded representation of the current picture has two sub-bitstreams. In an example, the sub-bitstream (e.g., a first sub-bitstream) that represents the scaled version of the current picture can be sent first, followed by the sub-bitstream (e.g., a second sub-bitstream) that represents the current picture in full scale.

Figure 10:
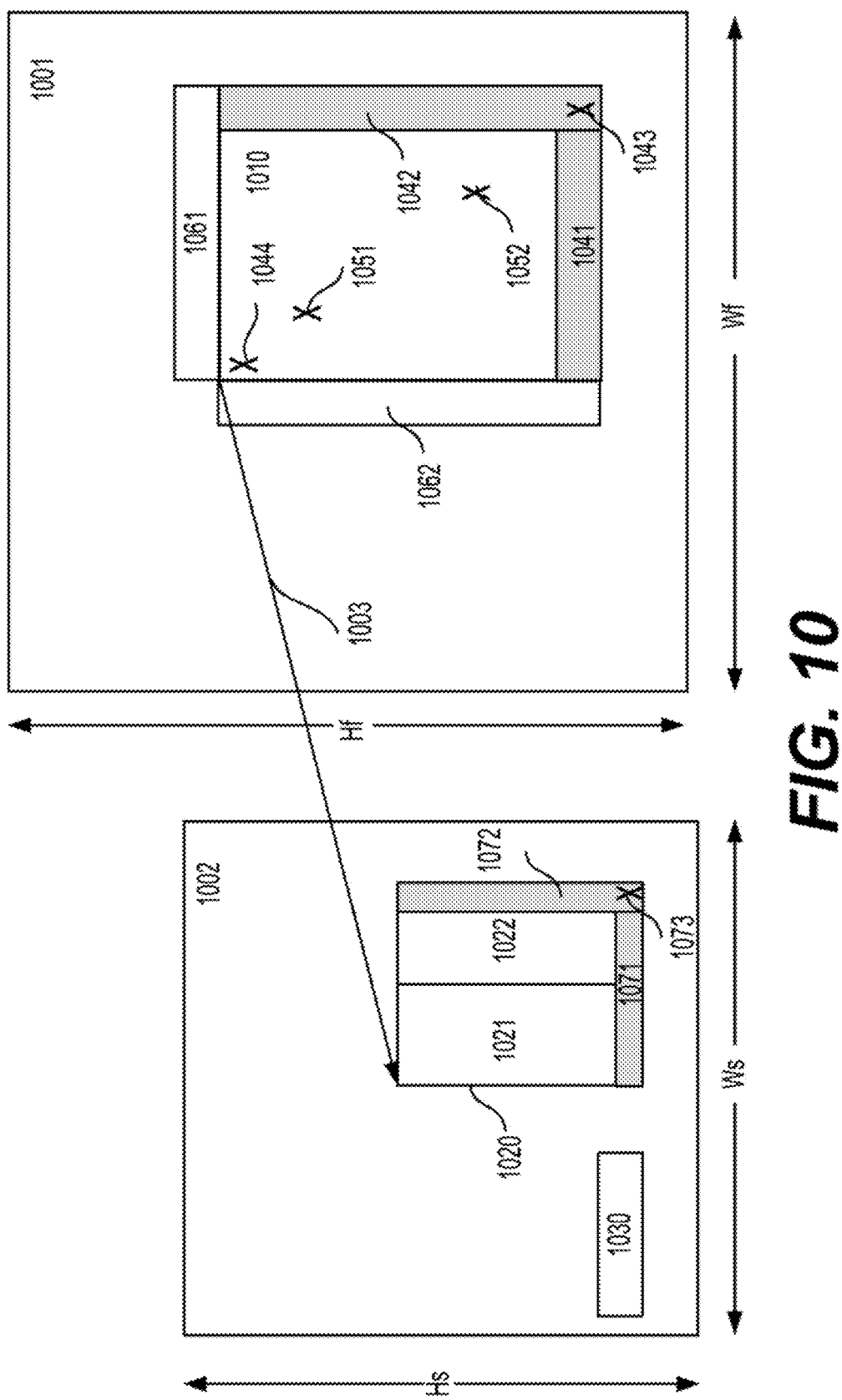
FIG. 10 shows a current picture in a full scale and a scaled version of the current picture according to embodiments of the disclosure.

In an embodiment, the bitstream can include the first sub-bitstream that corresponds to the scaled version of the current picture and the second sub-bitstream that corresponds to the current picture in the full scale, such as shown in FIG. 10. FIG. 10 shows the current picture in the full scale (1001) and the scaled version (1002) of the current picture according to embodiments of the disclosure. The current picture in the full scale (1001) and the scaled version (1002) can correspond to the same current picture and have different spatial resolutions. The scaled version (1002) can have a first spatial resolution, such as Ws×Hs samples. Ws and Hs can be the width and the height of the scaled version (1002). The current picture in the full scale (1001) can have a second spatial resolution, such as, such as Wf×Hf samples. Wf and Hf can be the width and the height of the current picture in the full scale (1001). The second spatial resolution can be higher than the first spatial resolution. An original resolution of the scaled version (1002) can refer to the second spatial resolution.

In this framework, the scaled version of the current picture, after decoding, can be up-sampled to its original resolution, to be used as a reference for predicting the current picture in full scale. The up-scaling (or up-sampling) procedure that applies to the decoded scaled version of current picture can be specified, in a way that the same re-sampled reconstructed picture can be generated. In an embodiment, referring to FIG. 10, the scaled version (1002) of the current picture, after decoding, can be up-sampled to the original resolution of the current picture in full scale (1001) and subsequently used as the reference or a predictor to predict the current picture in full scale (1001). In another embodiment, the scaled version (1002) of the current picture can be used as the reference or the predictor to predict the current picture in full scale (1001) without being up-sampled.

The scaled version of the current picture may be 1) a smaller picture width but a same picture height, 2) a smaller picture height but the same picture width, 3) a smaller picture width and a smaller picture height. The scaled version of the current picture may have a smaller picture width than a picture width of the current picture in full scale and a same picture height as a picture height of the current picture in full scale. The scaled version of the current picture may have a smaller picture height than the picture height of the current picture in full scale and the same picture width as the picture width of the current picture in full scale. The scaled version of the current picture may have a smaller picture width than the picture width of the current picture in full scale and a smaller picture height than the picture height of the current picture in full scale, such as shown in FIG. 10.

The scaled version of the current picture and the current picture in the full scale can have a same partitioning structure, and thus each block in the current picture in the full scale is collocated with a respective block in the scaled version.

The scaled version of the current picture and the current picture in the full scale can have separate partitioning structures, and thus a block in the current picture in the full scale may not be collocated with a block in the scaled version. Referring to FIG. 10, the current picture in the full scale (1001) includes a second block (1010). The second block (1010) can be collocated with a first region (1020) in the scaled version (1002) of the current picture, for example, the second block (1010) in the current picture in the full scale (1001) and the first region (1020) in the scaled version (1002) correspond to the same physical region in the current picture. The second block (1010) in the current picture in the full scale (1001) and the first region (1020) in the scaled version (1002) can have the same shape. A size of the first region (1020) can be scaled to a size of the second block (1010) based on, for example, Ws, Hs, Wf, and Hf.

According to an embodiment of the disclosure, the first region (1020) in the scaled version (1002) of the current picture can be collocated with the second block (1010) in the current picture in the full scale (1001). The first region (1020) can overlap with one or more first blocks in the scaled version (1002) of the current picture. In the example shown in FIG. 10, the first region (1020) overlaps with first blocks (1021)-(1022) in the scaled version (1002) of the current picture. In the example shown in FIG. 10, the first blocks (1021)-(1022) completely overlap with the first region (1020) and the first region (1020) includes the first blocks (1021)-(1022).

In some embodiments, the one or more first blocks partially overlap with the first region (1020) due to the different partitioning structures. For example, one of the one or more first blocks includes samples that are outside the first region (1020).

The scaled version (1002) of the current picture from the first sub-bitstream can be reconstructed, for example, samples in the scaled version (1002) are reconstructed. The second block (1010) in the current picture in the full scale (1001) can be reconstructed based on one of (i) partitioning information of the one or more first blocks (1021)-(1022) in the scaled version (1002) or (ii) intra prediction information of the one or more first blocks (1021)-(1022) in the scaled version (1002).

In an embodiment, prediction on partitioning, e.g., using the partitioning results of the scaled picture, after expanding the block sizes as indicated by a scaling ratio, can be used as the basis for predicting the partitioning of the current picture in full scale. For example, a bitstream may include a first sub-bitstream that corresponds to a scaled version of a current picture having a first spatial resolution and a second sub-bitstream that corresponds to a current picture in a full scale having a second spatial resolution that is higher than the first spatial resolution. Furthermore, one or more first blocks in the scaled version of the current picture are collocated with a second block in the current picture in the full scale. An example method can reconstruct the one or more first blocks in the scaled version of the current picture from the first sub-bitstream. Then, the disclosed method can reconstruct the second block in the current picture in the full scale based on (i) partitioning information of the one or more first blocks in the scaled version or (ii) intra prediction information of the one or more first blocks in the scaled version.

In an example, the scaling ratio is 2, a block (e.g., a 16×16 block) in the current picture in full scale is collocated with and corresponds to a block (e.g., an 8×8 block) in the scaled picture. If the 8×8 block in the scaled picture is coded as an 8×8 block without splitting, the 16×16 block in the current picture in full scale can be inferred as not splitting and can be coded as a 16×16 block. If the 8×8 block in the scaled picture is split and coded as four 4×4 blocks, the 16×16 block in the current picture in full scale can be inferred as splitting into four 8×8 blocks and each of the four 8×8 blocks is coded separately.

Referring to FIG. 10, the partitioning information of the scaled version (1002) can be used to predict partitioning information of the current picture in the full scale (1001). The partitioning information of the first block (1021) can indicate whether the first block (1021) is split into smaller blocks. The partitioning information of the first block (1022) can indicate whether the first block (1022) is split into smaller blocks. Accordingly, whether to partition the second block (1010) in the current picture in the full scale (1001) can be determined based on the partitioning information of the first blocks (1021)-(1022). The second block (1010) can be reconstructed based on a determination of whether to partition the second block (1010).

In one embodiment, one flag for each block size can be signaled to indicate if further split is needed.

In an embodiment, a flag for the second block (1010) is signaled. If the second block (1010) is determined to be partitioned based on the partitioning information of the first blocks (1021)-(1022), the flag can indicate whether a split is applied to a block partitioned from the second block (1010). If the second block (1010) is determined not to be partitioned based on the partitioning information of the first blocks (1021)-(1022), the flag can indicate whether a split is applied to the second block (1010).

In an example, a flag for each of the first blocks (1021)-(1022) is signaled to indicate if the first blocks (1021)-(1022) are to be further split.

In one embodiment, the flags indicating the partitioning mode of scaled picture can be used as the context for entropy coding of the partitioning mode of the current picture with full scale.

In an example, the partitioning information includes a flag for each of the one or more first blocks (1021)-(1022) indicating whether the respective first block (e.g., (1021) or (1022)) is split into smaller blocks. Partitioning information of the second block (1010) can be entropy coded (e.g., entropy encoded or entropy decoded) and the flag for each of the one or more first blocks (1021)-(1022) can be used as a context for the entropy coding (e.g., entropy encoding or entropy decoding).

The reconstructed samples of the scaled picture can be used in the intra prediction process of the current picture with full scale.

A bottom row, a right column, or a bottom-right corner of the current picture with full scale can use collocated position(s) in the reconstructed sample(s) of the scaled picture to predict. Together with the top and left reconstructed sample of the full resolution picture, remaining samples of the current block can be interpolated and predicted. Examples of such interpolation include a planar mode, a bi-lateral interpolation, or the like.

In an embodiment, referring to FIG. 10, a first sample (e.g., a sample (1043)) in the second block (1010) is predicted based on a reconstructed sample (e.g., (1073)) in the first region (1020) in the scaled version (1002) of the current picture. The first sample in the second block (1010) can be collocated with the reconstructed sample in the first region (1020). Referring to FIG. 10, the sample (1043) is located at a bottom-right corner of the second block (1010), and is collocated with the reconstructed sample (1073) that is located at a bottom-right corner of the first region (1020).

A second sample (e.g., a sample at a position (1051) or a sample at a position (1052)) in the second block (1010) can be predicted by interpolation based on at least the predicted first sample (1043) in the second block (1010) and reconstructed sample(s) (e.g., a top-left reconstructed sample (1044)) in the second block (1010). A predictor of the second block (1010) can include (i) the predicted first sample (1043) in the second block (1010), (ii) the reconstructed samples (e.g., the top-left reconstructed sample (1044)) in the second block (1010), and (iii) the predicted second sample (e.g., the predicted sample at the position (1051) or the predicted sample at the position (1052)) in the second block (1010). The second block (1010) can be reconstructed from the predictor of the second block (1010).

In an embodiment, referring to FIG. 10, a bottom row (1041), a right column (1042), or the bottom-right corner (1043) of the second block (1010) can be predicted based on the reconstructed sample(s) at respective collocated position(s) in the first region (1020) of the scaled version (1002). For example, the bottom row (1041) is predicted based on the reconstructed samples at the bottom row (1071) in the first region (1020). The right column (1042) is predicted based on the reconstructed samples at the right column (1072) in the first region (1020).

The predicted bottom row (1041), the predicted right column (1042), and/or the predicted bottom-right corner (1043) of the second block (1010) can be used together with the top and left reconstructed sample(s) (e.g., the sample (1044)) of the second block (1010) in the current picture in the full scale (1001) to predict remaining samples of the second block (1010) by interpolation. As described above, in some examples of intra prediction, a limitation is that prediction samples generated from a top-left reconstruction area has less correlation with a bottom-right region of a current block, and thus the prediction for the bottom-right region may not be accurate. The method described uses a reconstructed bottom-right region of the scaled version (1002) (e.g., (1071), (1072), and/or (1073)) to predict the bottom-right region (e.g., (1041), (1042), and/or (1043)) in the second block (1010), and thus the predicted samples in the second block (1010) can be more accurate.

A regular intra prediction block of the current picture with full scale can be blended with the up-sampled reconstructed block of the collocated position, giving more weights at a bottom-right corner of the current block to the prediction from scaled picture, giving more weights at top and left corners of the current block to the prediction from full resolution picture.

Referring to FIG. 10, samples in the second block (1010) can be predicted using intra prediction to obtain an intra prediction block of the second block (1010) in the current picture in the full scale (1001). (i) The predicted samples (e.g., the intra-predicted samples) in the second block (1010) obtained from the intra prediction and (ii) corresponding up-sampled reconstructed samples in the first region (1020) can be blended using a weighted average. Weights of the blended samples in the second block (1010) can depend on positions of the blended samples in the second block (1010). In an example, the closer a blended sample is to the bottom-right corner (1043) of the second block (1010), the larger the weight given to the reconstructed sample in the first region (1020). In an example, the closer a blended sample is to the top and left corners of the second block (1010), the larger the weight given to the intra-predicted sample in the second block (1010). For example, the position (1051) is associated with a first weight for the intra-predicted sample in the second block (1010), and the position (1052) is associated with a second weight for the intra-predicted sample in the second block (1010). The first weight is larger than the second weight.

The method described uses position-dependent weights and thus gives more weights to samples that are more likely to be accurate, and thus the predicted samples in the second block (1010) can be more accurate.

Prediction of intra prediction mode (IPM) from the scaled picture to the full resolution picture can be performed for collocated positions. The prediction can be used as an additional candidate in a list, such as in the most probable mode (MPM) list. Alternatively, the prediction can be used together with the IPMs from spatially neighboring blocks to derive the MPM list. For a chroma component, the direct mode (DM) may be either from the IPM associated with co-located luma block from the full-scale picture or the scaled picture.

In an example, the intra prediction information includes IPM information of the one or more first blocks (1021)-(1022), such as IPM(s) used to code the one or more first blocks (1021)-(1022). An IPM for the second block (1010) may be predicted based on the IPM information of the one or more first blocks (1021)-(1022). An MPM list for the second block (1010) can be constructed based on the IPM information of the one or more first blocks (1021)-(1022). In an example, the predicted IPM is used as an additional candidate in the MPM list for the second block (1010). In another example, the prediction can be used together with the IPMs from spatially neighboring blocks of the second block (1010) to derive the MPM list. For a chroma component, the DM direct mode of a chroma block may be either from the IPM associated with a collocated luma block from the current picture in the full scale (1001) or the scaled version (1002). The second block (1010) can be reconstructed based on the MP M list.

In Multiple Reference Lines (MRL) mode, in addition to the directly adjacent line of neighboring samples, one of the two non-adjacent reference lines can be used as the reference line for intra-picture prediction of luma samples. The non-adjacent reference line can be two or three lines away from the current block. Prediction of the reference line index from the scaled picture to the full resolution picture for collocated positions can be performed. The reference line used in the collocated positions from the scaled picture can be used to predict the reference line of the current block in the full-scale picture.

In an embodiment, the intra prediction information includes reference line index information of the one or more first blocks (1021)-(1022), such as the respective reference lines or the respective reference line indices used for the one or more first blocks (1021)-(1022), respectively. A reference line index or a reference line for the second block can be predicted based on the reference line index information of the one or more first blocks (1021)-(1022). The second block (1010) can be reconstructed based on the reference line index (or the reference line) for the second block (1010).

An intra skip mode is used for coding the current block in the full-scale picture. In an example, when the intra skip mode is used, all the prediction mode is inherited from the prediction mode associated with the co-located sample in scaled picture. In addition, when the intra skip mode is applied, the residual samples may be assumed to be zero and none of the syntaxes related to residual coding is signaled.

In an embodiment, an intra skip mode is used to code the second block (1010) in the current picture in the full scale (1001). A prediction mode of one (e.g., (1021) or (1022)) of the one or more first blocks (1021)-(1022) in the scaled version (1002) can be inherited by the second block (1010). The second block (1010) can be reconstructed based at least on the inherited prediction mode. When the intra skip mode is applied to the second block (1010) in the current picture in the full scale (1001), the residual samples of the second block (1010) may be assumed to be zero and none of the syntaxes related to residual coding is signaled for the second block (1010).

The reconstructed samples of the scaled picture can be used as predictors in the inter-layer prediction process of the current picture with full scale. In an example, the scaled picture is in a base layer, and the current picture in the full scale is in an enhancement layer.

The collocated, up-sampled reconstructed samples in the scaled picture can be used as a predictor to the current block in the current picture with full scale. In this case, the displacement vector pointing from the current block position to the reference block position in the scaled picture is to be zero. In an example, referring to FIG. 10, the collocated and up-sampled reconstructed samples the first region (1020) can be a predictor for the second block (1010) in the current picture in the full scale (1001). A vector (e.g., a displacement vector) (1003) points from the second block (1010) to a reference block (e.g., the up-sampled and reconstructed first region (1020) in the scaled version (1002) can be zero, for example, as the second block (1010) and the reference block are collocated.

This prediction block can be filtered before applying as a predictor. The reference samples on top and to the left of the current block in the current picture with full scale, can be used to enhance this prediction block.

In an embodiment, referring to FIG. 10, the up-sampled and reconstructed first region (1020) collocated with the second block (1010) can be filtered before being used as a predictor for the second block (1010). Reference samples (1061)-(1062) above the second block (1010) and/or to the left of the second block (1010) can be used to enhance (e.g., filter) the up-sampled and reconstructed first region (1020).

This prediction block can be combined with another predictor that is generated from intra prediction process in the current picture with full scale, such a described above in the blending process.

In one example, equal weighting is applied to each sample in the block.

In another example, depending on the sample location in the block, different weightings can be applied. For example, when the current location is away from top and/or left reference samples, more weights can be assigned to the predictor from scaled picture.

Referring to FIG. 10, a first predictor is the up-sampled and reconstructed first region (1020) collocated with the second block (1010). A second predictor can be generated from the second block (1010) in the current picture with the full scale (1001) using intra prediction. The first predictor and the second predictor can be combined using a weighted average. In an example, equal weighting is applied to each sample in the second block (1010). In an example, different weightings can be applied depending on the location in the second block (1010). For example, when the current location is further away from the top reference samples and/or the left reference samples, more weights can be assigned to the first predictor from the scaled version (1002).

The residue signals of the scaled picture can be used as predictors for coding the residue signals of the current picture with full scale. In an example, residues for samples in the second block (1010) in the current picture in the full scale (1001) can be predicted based on residues of the reconstructed samples in the first region (1020) in the scaled version (1002).

The significant map, which is the distribution of non-zero residues in the block, can have correlations between the collocated positions of the scaled picture and the picture with full scale. Here, the distribution of non-zero residues in the block can be either sample-based 0 or 1 signaling or sub-block based signaled, such as 1 bit used for each 4×4 sub-block to indicate if there is any non-zero residue inside this region. Referring to FIG. 10, a distribution of non-zero residues in the first region (1020) in the scaled version (1002) can be correlated with a distribution of non-zero residues in the second block (1010) in the current picture in the full scale (1001) where the second block (1010) is collocated with the first region (1020).

In one embodiment, the significant map (or the distribution of non-zero residues in the block) of the collocated block in the scaled picture can be used to predict whether a collocated location in the block of the current picture with full scale has non-zero residue. In an example, whether the samples in the second block (1010) have non-zero residues is predicted based on a distribution of non-zero residues in the first region (1020).

In another embodiment, the significant map (the distribution of non-zero residues in the block) of the collocated block in the scaled picture can be used to as a context when arithmetic coding the significant map of collocated locations in the block of the current picture with full scale. In an example, a distribution of non-zero residues in the second block (1010) is arithmetic decoded. A distribution of non-zero residues in the first region (1020) can be used as a context for the arithmetic decoding.

In the above methods, the scaled picture may not be needed for coding of every block/CTU in the current picture with full scale. When some of the blocks in the scaled picture is not used for prediction, their reconstructed values do not provide useful information therefore these blocks can be skipped or processed coarsely during coding of the scaled picture. In one example, for blocks that are not used, they are coded using a constant sample value. In another example, a syntax can be designed for at block level or CTU level to signal that this block/CTU will be skipped without any content. In the embodiments described in the disclosure, the scaled version (1002) may not be used to code every block and/or every CTU in the current picture in the full scale (1001). When a block (1030) in the scaled version (1002) is not used for prediction, reconstructed samples in the block (1030) may not provide useful information. Thus, the block (1030) can be skipped or processed coarsely during coding of the scaled version (1002). In an example, for blocks (e.g., including the block (1030)) in the scaled version (1002) that are not used, the blocks are coded using a constant sample value. In another example, a syntax can be designed at a block level or a CTU level to signal that a corresponding block or a corresponding CTU in the scaled version (1002) is skipped without any content.

In an example, the first sub-bitstream includes the entire scaled version (1002), and each block in the scaled version (1002) is coded and included in the first sub-bitstream. In an example, the first sub-bitstream includes a portion of the scaled version (1002), first blocks in the scaled version (1002) are coded and included in the first sub-bitstream, and second blocks in the scaled version (1002) are not coded and not included in the first sub-bitstream. In an example, the second blocks are processed coarsely (e.g., using a constant sample value).

In an example, the second sub-bitstream includes the entire current picture in the full scale (1001), and each block in the entire current picture in the full scale (1001) is coded and included in the second sub-bitstream. In an example, the second sub-bitstream includes a portion of the current picture in the full scale (1001), first samples in the current picture in the full scale (1001) are coded and included in the second sub-bitstream, and samples in the current picture in the full scale (1001) are not coded and not included in the second sub-bitstream.

Figure 11:
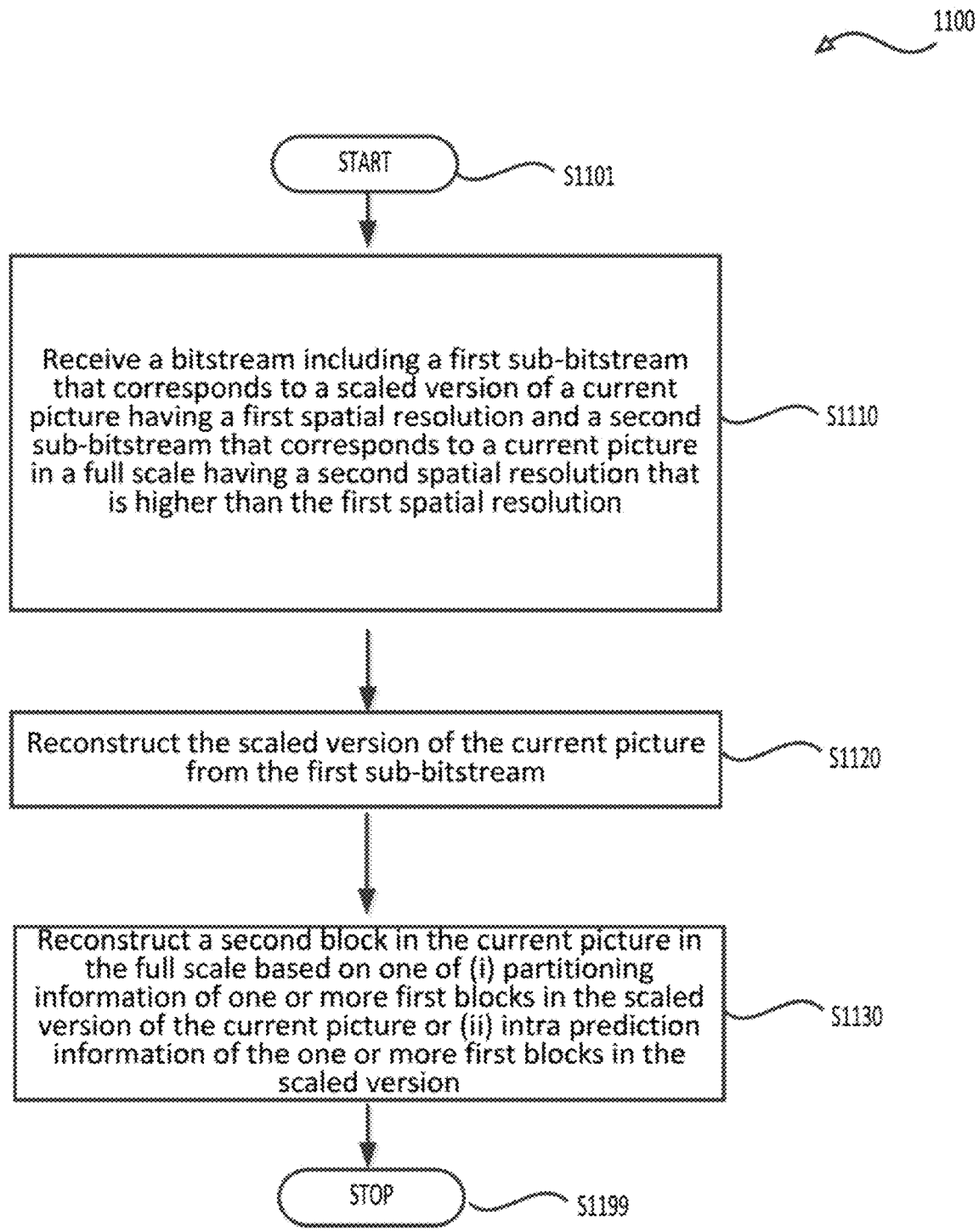
FIG. 11 shows a flow chart outlining a decoding process according to some embodiment of the disclosure.

FIG. 11 shows a flow chart outlining a process (1100) according to an embodiment of the disclosure. The process (1100) can be used in a video decoder. In various embodiments, the process (1100) is executed by processing circuitry, such as the processing circuitry that performs functions of the video decoder (110), the processing circuitry that performs functions of the video decoder (210), and the like. In some embodiments, the process (1100) is implemented in software instructions, thus when the processing circuitry executes the software instructions, the processing circuitry performs the process (1100). The process (1100) starts at (S1101) and proceeds to (S1110).

At (S1110), a bitstream including a first sub-bitstream that corresponds to a scaled version of a current picture having a first spatial resolution and a second sub-bitstream that corresponds to a current picture in a full scale having a second spatial resolution that is higher than the first spatial resolution is received.

At (S1120), the scaled version of the current picture can be reconstructed from the first sub-bitstream.

At (S1130), the second block in the current picture in the full scale can be reconstructed based on (i) partitioning information of one or more first blocks in the scaled version of the current picture or (ii) intra prediction information of the one or more first blocks in the scaled version.

In an example, a first region in the scaled version of the current picture is collocated with a second block in the current picture in the full scale, and the first region overlap with one or more first blocks in the scaled version of the current picture, such as described in FIG. 10.

In an example, a first sample in the second block can be predicted based on a reconstructed sample in the first region in the scaled version of the current picture. The first sample in the second block is collocated with the reconstructed sample in the first region. A second sample in the second block can be predicted by interpolation based on at least the predicted first sample in the second block and a top-left reconstructed sample in the second block. A predictor of the second block includes (i) the predicted first sample in the second block, (ii) the top-left reconstructed sample in the second block, and (iii) the predicted second sample in the second block. The second block is reconstructed from the predictor of the second block.

In an example, samples in the second block are predicted using intra prediction. (i) The predicted samples in the second block and (ii) corresponding up-sampled reconstructed samples in the first region in the scaled version of the current picture can be blended using a weighted average. Weights of the blended samples in the second block depend on positions of the blended samples in the second block.

In an example, the reconstructed samples in the first region of the scaled version of the current picture are up-sampled. The up-sampled samples in the first region of the scaled version are filtered. The second block can be reconstructed with the filtered up-sampled samples in the first region as a predictor for the second block.

In an example, residues for samples in the second block can be predicted based on residues of the reconstructed samples in the first region. Whether the samples in the second block have non-zero residues can be predicted based on a distribution of non-zero residues in the first region. In an example, a distribution of non-zero residues in the second block is arithmetic decoded, and a distribution of non-zero residues in the first region is used as a context for the arithmetic decoding.

Then, the process proceeds to (S1199) and terminates.

The process (1100) can be suitably adapted. Step(s) in the process (1100) can be modified and/or omitted. Additional step(s) can be added. Any suitable order of implementation can be used.

In an embodiment, the partitioning information of the one or more first blocks indicates whether each of the one or more first blocks is split into smaller blocks. The second block can be reconstructed based on the partitioning information of the one or more first blocks by determining whether to partition the second block in the current picture in the full scale based on the partitioning information of the one or more first blocks, and reconstructing the second block based on a determination of whether to partition the second block.

In an example, the second sub-bitstream includes a flag for the second block. In response to the determination of partitioning the second block, the flag indicates whether a split is applied to a block partitioned from the second block. In response to the determination of not partitioning the second block, the flag indicates whether a split is applied to the second block.

In an example, the partitioning information includes a flag for each of the one or more first blocks indicating whether the respective first block is split into smaller blocks. Partitioning information of the second block can be entropy decoded, and the flag for each of the one or more first blocks can be used as a context for the entropy decoding.

In an example, the intra prediction information includes intra prediction mode (IPM) information of the one or more first blocks. A most probable mode (MPM) list for the second block can be constructed based on the IPM information of the one or more first blocks. The second block can be reconstructed based on the MPM list.

In an example, the intra prediction information includes reference line index information of the one or more first blocks. A reference line index for the second block can be determined based on the reference line index information of the one or more first blocks and the second block can be reconstructed based on the reference line index for the second block.

In an example, the second sub-bitstream indicates that an intra skip mode is used for the second block. The intra prediction information indicates a prediction mode of one of the one or more first blocks. The prediction mode of the one of the one or more first blocks can be used for the second block and the second block can be reconstructed based on the prediction mode.

Figure 12:
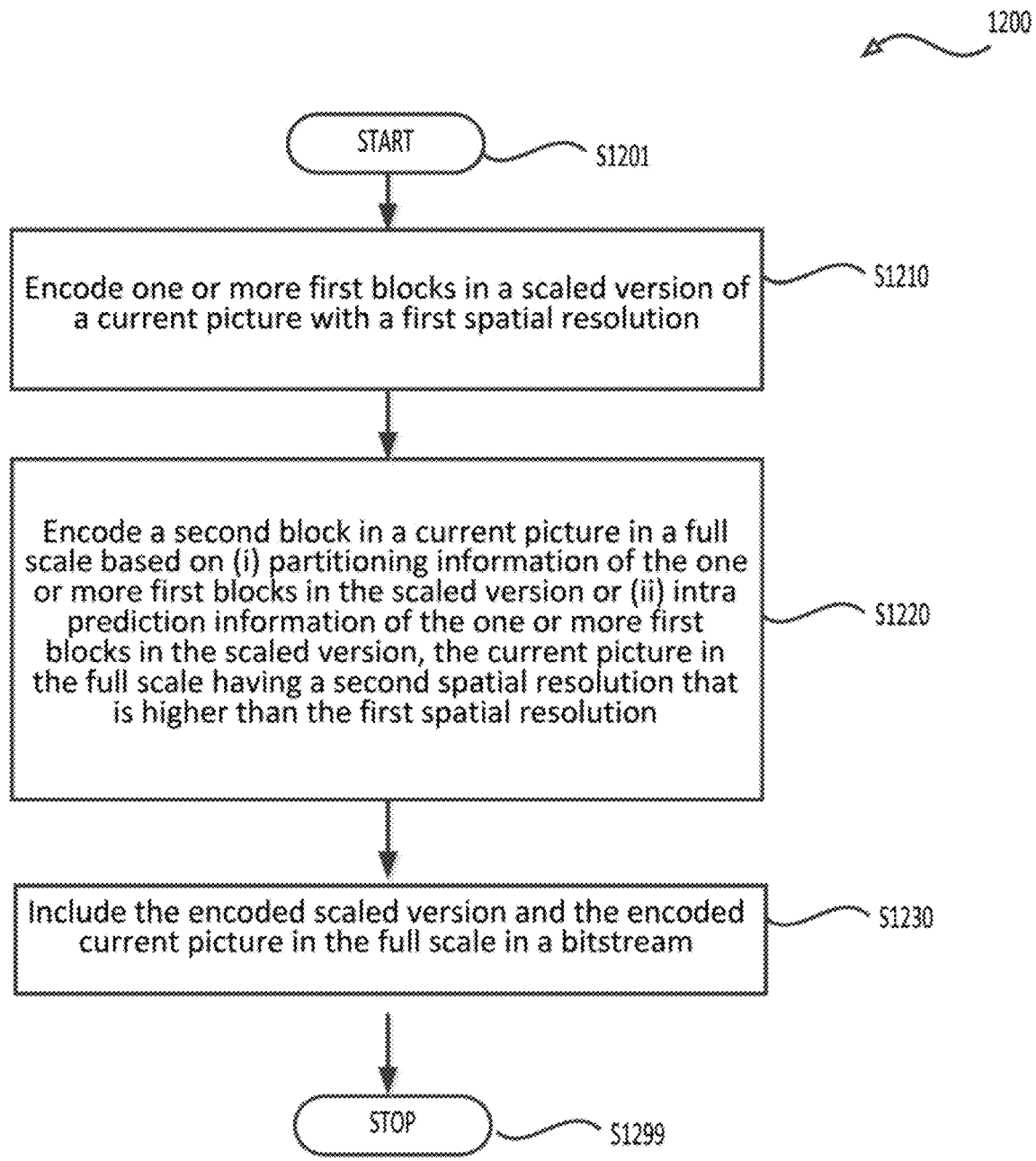
FIG. 12 shows a flow chart outlining an encoding process according to some embodiment of the disclosure.

FIG. 12 shows a flow chart outlining a process (1200) according to an embodiment of the disclosure. The process (1200) can be used in a video encoder. In various embodiments, the process (1200) is executed by processing circuitry, such as the processing circuitry that performs functions of the video encoder (103), the processing circuitry that performs functions of the video encoder (303), and the like. In some embodiments, the process (1200) is implemented in software instructions, thus when the processing circuitry executes the software instructions, the processing circuitry performs the process (1200). The process starts at (S1201) and proceeds to (S1210).

At (S1210), one or more first blocks in a scaled version of a current picture with a first spatial resolution are encoded. A first region in the scaled version overlaps with the one or more first blocks.

At (S1220), a second block in a current picture in a full scale can be encoded based on (i) partitioning information of the one or more first blocks in the scaled version or (ii) intra prediction information of the one or more first blocks in the scaled version. The current picture in the full scale has a second spatial resolution that is higher than the first spatial resolution. The first region in the scaled version is collocated with the second block in the current picture in the full scale.

At (S1230), an encoded scaled version including the encoded one or more first blocks and an encoded current picture in the full scale including the encoded second block can be included in a bitstream.

Then, the process proceeds to (S1299) and terminates.

The process (1200) can be suitably adapted. Step(s) in the process (1200) can be modified and/or omitted. Additional step(s) can be added. Any suitable order of implementation can be used. Embodiments described in FIGS. 10-11 can be suitably adapted and used in the process (1200).

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
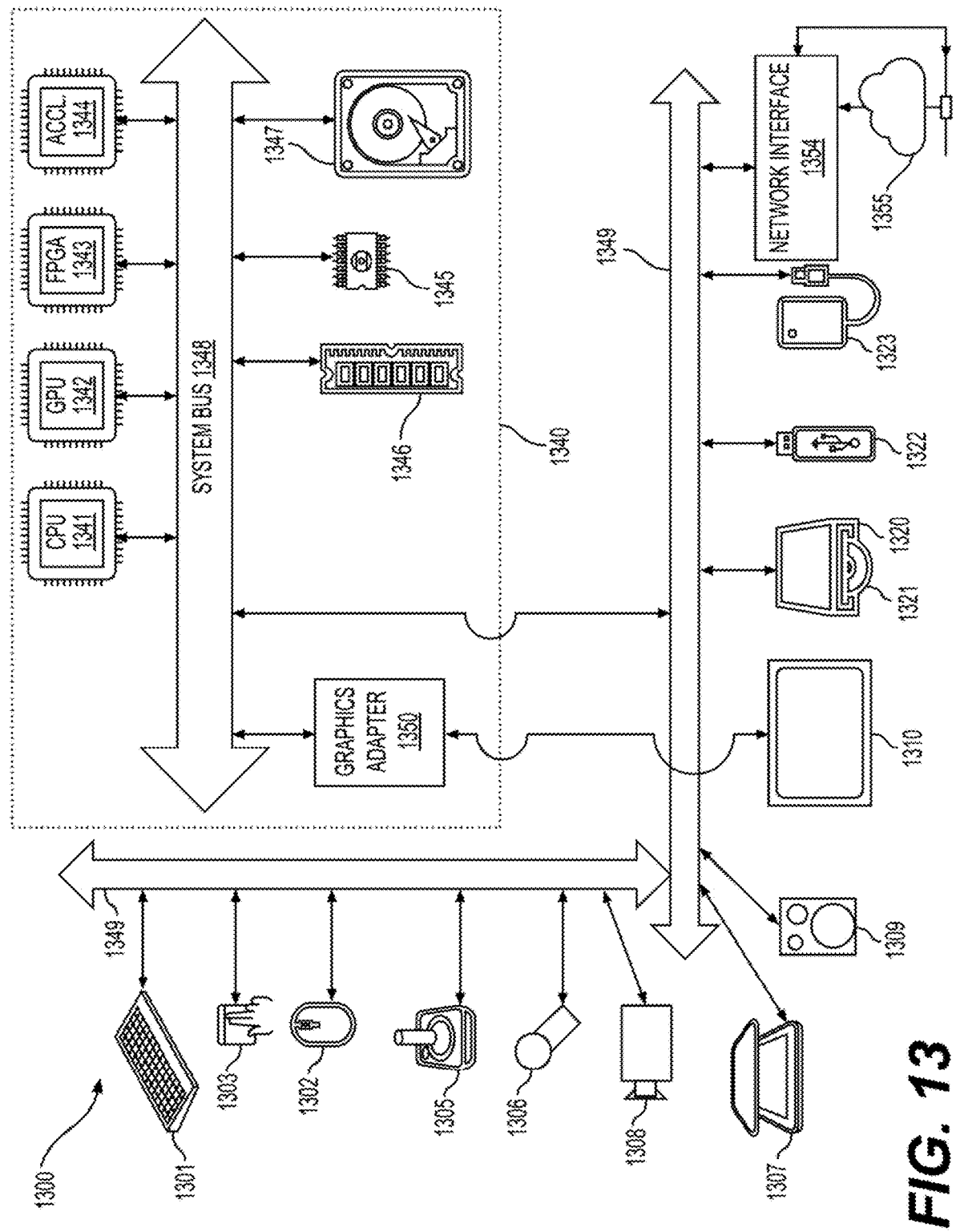
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC))

storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding, comprising:
   receiving a bitstream including a first sub-bitstream that corresponds to a scaled version of a current picture having a first spatial resolution and a second sub-bitstream that corresponds to the current picture in a full scale having a second spatial resolution that is higher than the first spatial resolution;
   reconstructing the scaled version of the current picture from the first sub-bitstream; and
   reconstructing a second block in the current picture in the full scale having the second spatial resolution based on (i) partitioning information of one or more first blocks in the scaled version of the current picture having the first spatial resolution or (ii) intra prediction information of the one or more first blocks in the scaled version of the current picture having the first spatial resolution, wherein
   a first region in the scaled version of the current picture is collocated with the second block in the current picture in the full scale, and the first region overlaps with the one or more first blocks in the scaled version of the current picture.

2. The method of claim 1, wherein
   the partitioning information of the one or more first blocks indicates whether each of the one or more first blocks is split into smaller blocks; and
   the reconstructing the second block includes reconstructing the second block based on the partitioning information of the one or more first blocks including:
      determining whether to partition the second block in the current picture in the full scale based on the partitioning information of the one or more first blocks, and
      reconstructing the second block based on a determination of whether to partition the second block.

3. The method of claim 2, wherein
   the second sub-bitstream includes a flag for the second block,
   when the second block is determined to be partitioned, the flag indicates whether a split is applied to a block partitioned from the second block, and
   when the second block is determined not to be partitioned, the flag indicates whether a split is applied to the second block.

4. The method of claim 2, wherein
   the partitioning information includes a flag for each of the one or more first blocks indicating whether the respective first block is split into smaller blocks; and
   the method further includes entropy decoding partitioning information of the second block, the flag for each of the one or more first blocks being used as a context for the entropy decoding.

5. The method of claim 1, wherein
   the intra prediction information includes intra prediction mode (IPM) information of the one or more first blocks; and
   the reconstructing the second block includes
      constructing a most probable mode (MPM) list for the second block based on the IPM information of the one or more first blocks; and
      reconstructing the second block based on the MPM list.

6. The method of claim 1, wherein
   the intra prediction information includes reference line index information of the one or more first blocks; and
   the reconstructing the second block includes
      determining a reference line index for the second block based on the reference line index information of the one or more first blocks; and
      reconstructing the second block based on the reference line index for the second block.

7. The method of claim 1, wherein
   the second sub-bitstream indicates that an intra skip mode is used for the second block;
   the intra prediction information indicates a prediction mode of one of the one or more first blocks; and
   the reconstructing the second block includes using the prediction mode of the one of the one or more first blocks for the second block and reconstructing the second block based on the prediction mode.

8. The method of claim 1, wherein the reconstructing the second block further comprises:
   predicting a first sample in the second block based on a reconstructed sample in the first region in the scaled version of the current picture, the first sample in the second block being collocated with the reconstructed sample in the first region; and
   predicting a second sample in the second block by interpolation based on at least the predicted first sample in the second block and a top-left reconstructed sample in the second block, a predictor of the second block including (i) the predicted first sample in the second block, (ii) the top-left reconstructed sample in the second block, and (iii) the predicted second sample in the second block, the second block being reconstructed from the predictor of the second block.

9. The method of claim 1, wherein the reconstructing the second block comprises:
   predicting samples in the second block using intra prediction; and
   blending (i) the predicted samples in the second block and (ii) corresponding up-sampled reconstructed samples in the first region in the scaled version of the current picture using a weighted average.

10. The method of claim 9, wherein weights of the blended samples in the second block depend on positions of the blended samples in the second block.

11. The method of claim 1, wherein the reconstructing the second block comprises:
    up-sampling reconstructed samples in the first region of the scaled version of the current picture;

filtering the up-sampled samples in the first region of the scaled version; and reconstructing the second block with the filtered up-sampled samples in the first region as a predictor for the second block.

12. The method of claim 1, wherein the reconstructing the second block comprises:

predicting residues for samples in the second block based on residues of reconstructed samples in the first region.

13. The method of claim 12, wherein the predicting the residues comprises:

predicting whether the samples in the second block have non-zero residues based on a distribution of non-zero residues in the first region.

14. The method of claim 12, wherein the predicting the residues comprises:

arithmetic decoding a distribution of non-zero residues in the second block, a distribution of non-zero residues in the first region being used as a context for the arithmetic decoding.

15. The method of claim 1, wherein the first region includes the one or more first blocks.

16. A method for video encoding, comprising:

encoding a scaled version of a current picture having a first spatial resolution, the scaled version of the current picture including one or more first blocks;

encoding a second block in the current picture in a full scale having a second spatial resolution based on (i) partitioning information of the one or more first blocks in the scaled version of the current picture having the first spatial resolution or (ii) intra prediction information of the one or more first blocks in the scaled version of the current picture having the first spatial resolution, the second spatial resolution being higher than the first spatial resolution; and generating a bitstream that includes the encoded scaled version of the current picture in a first sub-bitstream and the encoded second block in a second sub-bitstream, wherein a first region in the scaled version of the current picture is collocated with the second block in the current picture in the full scale, and the first region overlaps with the one or more first blocks in the scaled version of the current picture.

17. The method of claim 16, wherein the partitioning information of the one or more first blocks indicates whether each of the one or more first blocks is split into smaller blocks; and the encoding the second block includes encoding the second block based on the partitioning information of the one or more first blocks by determining whether to partition the second block in the current picture in the full scale based on the partitioning information of the one or more first blocks, and encoding the second block based on a determination of whether to partition the second block.

18. A non-transitory computer readable medium storing a video media bitstream encoded by an encoding method, the encoding method comprising:

encoding a scaled version of a current picture having a first spatial resolution, the scaled version of the current picture including one or more first blocks;

encoding a second block in the current picture in a full scale having a second spatial resolution based on (i) partitioning information of the one or more first blocks in the scaled version of the current picture having the first spatial resolution or (ii) intra prediction information of the one or more first blocks in the scaled version of the current picture having the first spatial resolution, the second spatial resolution being higher than the first spatial resolution; and generating the video media bitstream that includes the encoded scaled version of the current picture in a first sub-bitstream and the encoded second block in a second sub-bitstream, wherein a first region in the scaled version of the current picture is collocated with the second block in the current picture in the full scale, and the first region overlaps with the one or more first blocks in the scaled version of the current picture.

* * * * *